United States Patent [19]

Springer et al.

[11] Patent Number: 4,946,947
[45] Date of Patent: Aug. 7, 1990

[54] WATER-SOLUBLE AZO COMPOUNDS CONTAINING A BENZOTIAZOL-1-YL PHENYL MOIETY AS A DIAZO COMPONENT WHICH CARRY A FIBER-REACTIVE GROUP OF THE VINYLSULFONE SERIES

[76] Inventors: Hartmut Springer; Kurt Hussong, both of c/o Hoechst Aktiengesellschaft, P.O. Box 80 02 20, D-6230 Frankfurt am Main, Fed. Rep. of Germany

[21] Appl. No.: 361,225

[22] Filed: Jun. 5, 1989

Related U.S. Application Data

[63] Continuation of Ser. No. 169,831, Mar. 17, 1988, abandoned.

[30] Foreign Application Priority Data

Mar. 18, 1987 [DE] Fed. Rep. of Germany ....... 3708767

[51] Int. Cl.[5] .................... C09B 62/085; C09B 62/51; D06P 1/382; D06P 1/384
[52] U.S. Cl. ................................. 534/635; 534/638; 534/642; 534/560; 534/582
[58] Field of Search .................. 534/642, 636, 638

[56] References Cited
U.S. PATENT DOCUMENTS 4,556,707 12/1985 Henk ................................ 534/642 X
4,701,523 10/1987 Segal et al. ..................... 534/642 X Primary Examiner—Floyd D. Higel

[57] ABSTRACT

Water-soluble azo compounds of the general formula D—N=N—K in which D is a radical of the general formula

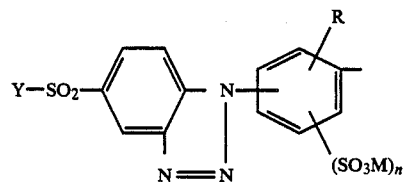

in which Y denotes the vinyl group or is an ethyl group which is substituted in the β-position by a substituent which can be eliminated by means of alkali, R stands for hydrogen, hydroxy, lower alkyl, lower alkoxy, carboxy or halogen, n is the number zero or 1, M is hydrogen or a salt-forming metal atom, and the free bond from the benzene ring to the azo groups is in the meta- or para-position to the nitrogen atom of the benzotriazole radical, and in which K is a radical of a water-soluble coupling component, such as, for example, from the series comprising the aminobenzenes, phenols, naphthols, aminonaphthols, acylaminonaphthols, pyrazolones, aminopyrazoles, acetoacetylarylides and hydroxypyridones.

The water-soluble azo compounds have fiber-reactive dye properties and dye carboxamide and/or hydroxyl group-containing materials, such as, for example, wool, synthetic nylon fibers and, in particular, cellulose fibers, in fast shades.

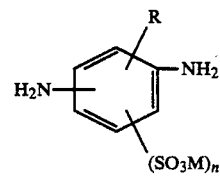

in which R, M and n have one of the meanings mentioned in claims 14 and the two primary amino groups are bound in the meta- or para-position to one another on the benzene ring, reducing the nitro group in the resultant compound, and reacting in said resultant compound the both primary amino groups with a diazotizing agent to give the diazonium compound, and, if desired, converting the β-hydroxyethyl group standing for the moiety Y', into another Y' group.

10 Claims, No Drawings

WATER-SOLUBLE AZO COMPOUNDS CONTAINING A BENZOTIAZOL-1-YL PHENYL MOIETY AS A DIAZO COMPONENT WHICH CARRY A FIBER-REACTIVE GROUP OF THE VINYLSULFONE SERIES

This is a continuation of U.S. patent application Ser. No. 169,831, filed Mar. 17, 1988, now abandoned.

DESCRIPTION

Water-soluble azo compounds, a process for their preparation, and their use as dyes The present invention is in the area of fiber-reactive dyes.

Novel water-soluble azo compounds corresponding to the general formula (1)

  (1)

have been found which have valuable fiber-reactive dye properties. In this formula (1):

D is a radical of the general formula (2)

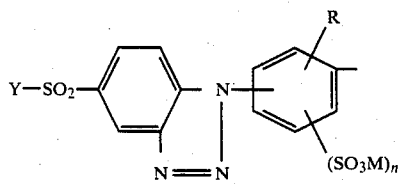  (2)

in which

Y denotes the vinyl group or a group of the general formula (3)

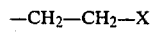  (3)

in which

X is a substituent which can be eliminated by means of an alkali with formation of the vinyl group, R is a hydrogen atom or a hydroxy group, an alkyl group having 1 to 4 carbon atoms, such as the ethyl or, in particular, the methyl group, an alkoxy group having 1 to 4 carbon atoms, such as the ethoxy or, in particular, the methoxy group, a carboxy group or a halogen atom, such as a chlorine or bromine atom, but is preferably a hydrogen atom, n stands for the number zero or 1, preferably 1 (the group denoting a hydrogen atom in the case where n=zero), M is a hydrogen atom or a salt-forming metal atom, such as, in particular, an alkali metal atom, such as, for example, sodium, potassium or lithium, and the free bond from the benzene ring to the azo group is bound in the meta- or para-position to the one nitrogen atom of the benzotriazole radical;

K is a radical of a monocouplable water-soluble coupling component, which can additionally contain an azo group, or the radical of a dicouplable water-soluble coupling component, each from the series comprising the aminobenzenes, the phenols, in particular the sulfonic acids and carboxylic acids thereof, the naphthols, in particular the sulfonic acids thereof, the aminonaphthols, in particular the sulfonic acids thereof, and the acylaminonaphthols, in particular the sulfonic acids thereof, containing the acyl radical of an alkanecarboxylic acid or alkenecarboxylic acid each having 1 to 4 or 2 to 4 carbon atoms in the alkyl or alkenyl radical respectively, or of an aromatic carboxylic acid, such as benzoic acid, or an aromatic sulfonic acid, such as benzenesulfonic acid or toluenesulfonic acid, or of an N-substituted carbamic acid, such as the N-phenylureido radical, or from the series comprising the dihydroxynaphthalenesulfonic acids, the phenylazo- and naphthylazoaminonaphtholsulfonic acids, the 5-pyrazolones and 5-aminopyrazoles, the acetoacetylarylides, the 2-hydroxy-6-pyridones and the hydroxyquinolines.

Substituents X which can be eliminated by means of alkali are, for example, halogen atoms, such as the bromine atom and the chlorine atom, ester groups of organic carboxylic and sulfonic acids, such as an alkanoyloxy radical having 2 to 5 carbon atoms, for example the acetyloxy group, or a sulfobenzoyloxy, benzoyloxy, phenylsulfonyloxy or toluylsulfonyloxy radical, in addition, for example, the acidic ester groups of phosphoric acid, sulfuric acid and thiosulfuric acid (phosphato, sulfato and thiosulfato groups respectively), and likewise dialkylamino groups containing alkyl groups each having 1 to 4 carbon atoms, such as the dimethylamino and diethylamino group.

Y is preferably the vinyl group and in particular the β-sulfatoethyl group.

Sulfo groups are groups corresponding to the general formula —$SO_3M$, carboxy groups are groups corresponding to the general formula —COOM, sulfato groups are groups corresponding to the general formula —$OSO_3M$, phosphono groups are groups of the general formula —$PO_3M_2$, thiosulfato groups are groups corresponding to the general formula —S—$SO_3M$, and phosphato groups are groups corresponding to the general formula —$OPO_3M_2$, where M has the abovementioned meaning.

Of the compounds of the general formula (1) according to the invention, those compounds may be emphasized, for example, in which K denotes a radical of the following formula (4a), (4b), (4c), (4d), (4e), (4f), (4g), (4h), (4i), (4k), (4m), (4n), (4p), (4q), (4r), (4s), (4t), (4v) or (4w):

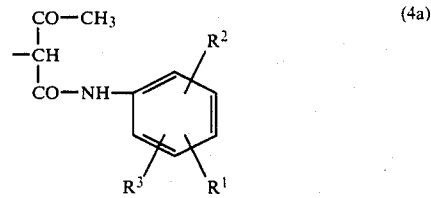  (4a)

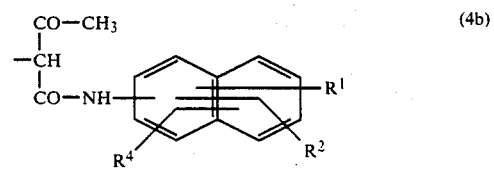  (4b)

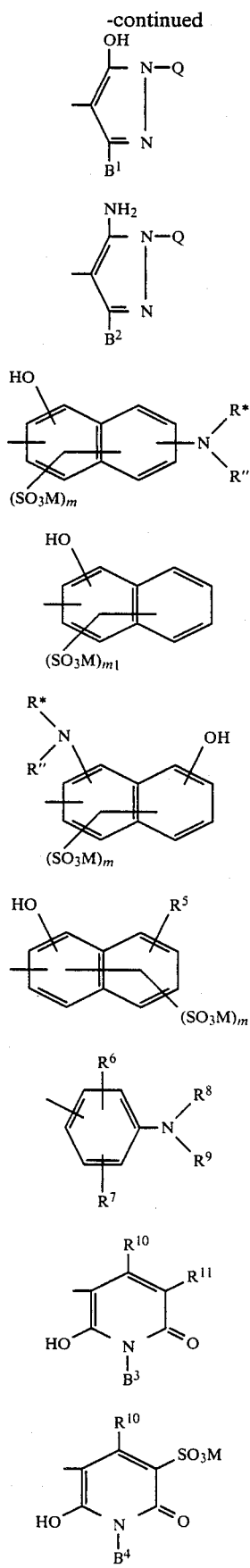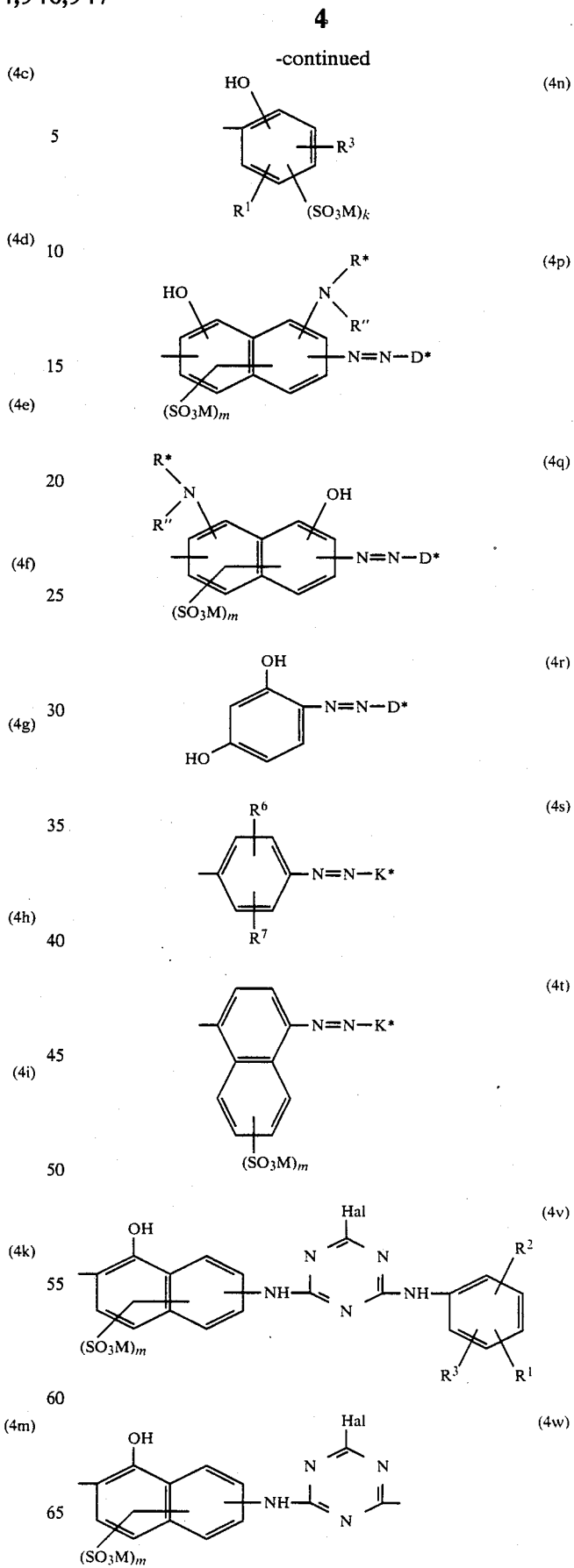

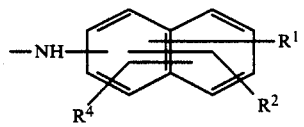

In these formulae:

$R^1$ is a hydrogen atom or a carboxy or sulfo group or a group of the general formula —$SO_2$—Y where Y has the above meaning;

$R^2$ is a hydrogen atom, an alkyl group having 1 to 4 carbon atoms, such as, in particular, a methyl or ethyl group, an alkoxy group having 1 to 4 carbon atoms, such as, in particular, a methoxy or ethoxy group, a chlorine or bromine atom or a carboxy or sulfo group;

$R^3$ is a hydrogen atom, an alkyl group having 1 to 4 carbon atoms, such as, in particular, the methyl or ethyl group, an alkoxy group having 1 to 4 carbon atoms, such as, in particular, the methoxy or ethoxy group, or a chlorine or bromine atom;

$R^4$ is a hydrogen atom or a sulfo or carboxy group, where $R^1$, $R^2$, $R^3$ and $R^4$ may be identical to one another or different from one another;

$B^1$ is an alkyl group having 1 to 4 carbon atoms, such as, in particular, the methyl group, a carboxy group, a carbalkoxy group having 2 to 5 carbon atoms, the carbamoyl group or a phenyl radical which is optionally substituted by sulfo, carboxy, methyl, ethyl, methoxy, ethoxy and/or chlorine;

$B^2$ is an alkyl group having 1 to 4 carbon atoms, such as, in particular, the methyl group, a carbalkoxy group having 2 to 5 carbon atoms, the carbamoyl group or a phenyl radical which may be substituted by 1 or 2 substituents from the series comprising alkyl having 1 to 4 carbon atoms, alkoxy having 1 to 4 carbon atoms, chlorine, bromine and sulfo;

Q is a phenyl radical which may be substituted, for example by 1, 2 or 3, preferably 1 or 2, substituents from the series comprising chlorine, bromine, methyl, ethyl, methoxy, ethoxy, carboxy, sulfo and alkanoylamino, such as acetylamino, and/or by a group of the general formula —$SO_2$—Y where Y has the abovementioned meaning, or is a naphthyl radical which may be substituted by 1, 2 or 3 sulfo groups and optionally by an alkyl group having 1 to 4 carbon atoms, an alkoxy group having 1 to 4 carbon atoms, a chlorine atom or an alkanoylamino group having 2 to 5 carbon atoms, and/or by a group of the general formula —$SO_2$—Y where Y has the abovementioned meaning;

R* is a hydrogen atom or an alkyl group having 1 to 4 carbon atoms which may be substituted by a phenyl radical;

R″ is a hydrogen atom, an alkyl group having 1 to 4 carbon atoms which may be substituted by a phenyl radical, or is a phenyl radical which may be substituted by 1 or 2 substituents from the series comprising alkyl having 1 to 4 carbon atoms, alkoxy having 1 to 4 carbon atoms, chlorine, bromine and sulfo;

$R^5$ is the phenylureido group, an alkanoylamino group having 2 to 5 carbon atoms, an alkenoylamino group having 3 to 5 carbon atoms, such as the acetylamino, propionylamino or acryloylamino group, or a benzoylamino group which may be substituted by chlorine, methyl, methoxy, nitro, sulfo and/or carboxy: preferably the acetylamino or benzoylamino radical;

$R^6$ is a hydrogen atom or an alkyl group having 1 to 4 carbon atoms, an alkoxy group having 1 to 4 carbon atoms, a sulfo group, a carboxy group, a carbalkoxy group having 2 to 5 carbon atoms, a halogen atom, such as a bromine or chlorine atom, or an alkoxy group which has 1 to 4 carbon atoms and is substituted by a hydroxy, acetyloxy, carboxy, carbamoyl or cyano group or by a halogen atom, such as a chlorine atom;

$R^7$ is a hydrogen atom, an alkyl group having 1 to 4 carbon atoms, an alkoxy group having 1 to 4 carbon atoms, a halogen atom, such as a bromine or chlorine atom, the cyano group, the trifluoromethyl group, an alkoxy group which has 1 to 4 carbon atoms and is substituted by a hydroxy, acetyloxy, carboxy, carbamoyl or cyano group or by a halogen atom, such as a chlorine atom, or is an alkanoylamino group which has 2 to 5 carbon atoms and may be substituted by chlorine, bromine, alkoxy having 1 to 4 carbon atoms, phenoxy, phenyl, hydroxy, carboxy or sulfo, or is an alkenoylamino group which has 3 to 5 carbon atoms and may be substituted by chlorine, bromine, carboxy or sulfo, or is the benzoylamino group which may be substituted in the benzene ring, for example by chlorine, methyl and/or sulfo, or is an alkylsulfonyl group having 1 to 4 carbon atoms, or the phenylsulfonyl group which may be substituted in the benzene ring, for example by chlorine, methyl and/or sulfo, or is an alkylsulfonylamino group which has 1 to 4 carbon atoms and may be substituted by hydroxy, sulfato, chlorine, bromine or alkoxy having 1 to 4 carbon atoms, or is the phenylsulfonylamino group which may be substituted in the benzene ring, for example by chlorine, methyl and/or sulfo, or is the carbamoyl group which may be monosubstituted or disubstituted on the nitrogen atom by 1 or 2 substituents from the series comprising alkyl having 1 to 4 carbon atoms, alkyl having 1 to 4 carbon atoms which is substituted, for example, by hydroxy sulfo, carboxy sulfato or phenyl, cycloalkyl having 5 to 8 carbon atoms, phenyl and phenyl which is substituted, for example, by chlorine, sulfo, methyl, methoxy and/or carboxy or is the sulfamoyl group which may be monosubstituted or disubstituted on the nitrogen atom by 1 or 2 substituents from the series comprising alkyl having 1 to 4 carbon atoms, alkyl having 1 to 4 carbon atoms which is substituted, for example, by hydroxy, sulfo, carboxy, sulfato or phenyl, cycloalkyl having 5 to 8 carbon atoms, phenyl and phenyl which is substituted, for example, by chlorine, sulfo, methyl, methoxy and/or carboxy, or is the ureido group, or a ureido group which may be monosubstituted or disubstituted on the terminal nitrogen atom by 1 or 2 substituents from the series comprising alkyl having 1 to 4 carbon atoms, alkyl having 1 to 4 carbon atoms which is substituted, for example, by hydroxy, sulfo, carboxy, sulfato or phenyl, cycloalkyl having 5 to 8 carbon atoms, phenyl, and phenyl which is substituted, for example, by chlorine, sulfo, methyl, methoxy and/or carboxy;

$R^8$ is a hydrogen atom or an alkyl group which has 1 to 4 carbon atoms and may be substituted, for example, by hydroxy, sulfo, carboxy, sulfato or phenyl, or is an alkenyl group which has 2 to 4 carbon atoms and may be substituted by a carboxy or sulfo group or by a chlorine or bromine atom, or is a cycloalkyl radical having 5 to 8 carbon atoms;

$R^9$ is a hydrogen atom or an alkyl group which has 1 to 4 carbon atoms and may be substituted, for example, by hydroxy, sulfo, carboxy, sulfato or phenyl, or is an alkenyl group which has 2 to 5 carbon atoms and may be substituted by a carboxy or sulfo group or by a chlorine or bromine atom, or is a cycloalkyl radical having 5 to 8 carbon atoms, or a phenyl radical which may be substituted, for example, by chlorine, sulfo, methyl, methoxy and/or carboxy, or a naphthyl radical which may be substituted by 1, 2 or 3 sulfo groups and optionally by a chlorine atom, an alkoxy group having 1 to 4 carbon atoms, an alkyl group having 1 to 4 carbon atoms, an alkanoylamino group having 2 to 5 carbon atoms or a benzoylamino group which is optionally substituted by sulfo, or is a heterocyclic radical which may contain one or two fused carbocyclic rings, it being possible for the carbocyclic rings to be further substituted and for the heterocyclic radical to be substituted on the carbon atoms and/or on the heterocyclic atoms by optionally substituted alkyl groups having 1 to 4 carbon atoms and/or optionally substituted phenyl radicals, or $R^8$ and $R^9$, together with the nitrogen atom and, where appropriate, further heteroatoms, represent a saturated heterocyclic radical, such as, for example, the morpholino or piperazino radical;

$R^{10}$ is a hydrogen atom or an alkyl group having 1 to 4 carbon atoms, or an alkyl group having 1 to 4 carbon atoms which is substituted by alkoxy having 1 to 4 carbon atoms or cyano;

$R^{11}$ is a hydrogen atom or a sulfo group, or a sulfoalkyl group containing an alkylene radical having 1 to 4 carbon atoms, such as the sulfomethylene group, or a cyano or carbamoyl group;

and $R^*$, $R''$, $R^1$, $R^5$, $R^6$, $R^7$, $R^9$, $R^{10}$ and $R^{11}$ may be identical to one another or different from one another;

$B^3$ is a hydrogen atom or an alkyl group which has 1 to 6 carbon atoms, preferably 1 to 4 carbon atoms, and may be substituted by phenyl, sulfo or sulfophenyl;

$B^4$ is a hydrogen atom, an alkyl group having 1 to 4 carbon atoms, an alkyl group having 1 to 4 carbon atoms, which is substituted by an alkoxy group having 1 to 4 carbon atoms, such as the methoxy group, or by a sulfo, carboxy sulfato, acetylamino, benzoylamino or cyano group, an alkenyl group having 2 to 4 carbon atoms, the cyclohexyl group, the phenyl group, or a phenyl radical which is substituted by substituents from the series comprising carboxy, sulfo, benzoylamino, acetylamino and chlorine;

k is the number zero or 1 (this group standing for a hydrogen atom in the case where k=zero);

m stands for the number 1 or 2;

$m_1$ stands for the number 1, 2 or 3;

D* has one of the meanings given for the general formula (2), in this case preferably the same meaning, or is a phenyl radical which may be substituted by 1, 2 or 3, preferably 1 or 2, substituents from the series comprising alkyl having 1 to 4 carbon atoms, alkoxy having 1 to 4 carbon atoms, chlorine, bromine, hydroxy, carboxy, sulfo, carbamoyl, sulfamoyl and alkanoylamine, of these preferably methyl, methoxy, ethoxy, chlorine, sulfo, carboxy and hydroxy/ and/or by a group of the formula —SO₂—Y where Y has the abovementioned meaning, one of these substituents preferably being a sulfo or carboxy group, or is a naphthyl radical which is substituted by 1, 2 or 3 sulfo groups or by 1 or 2 sulfo groups and 1 or 2 groups of the general formula —SO₂—Y where Y has the abovementioned meaning, or by only one such —SO₂—Y group, where D and D* may have meanings which are identical to one another or different from one another;

K* is a radical from one of the abovementioned and defined general formulae (4a) to (4m), where K and K* may have meanings which are identical to one another or different from one another;

Hal is a fluorine or chlorine atom; and

M has one of the abovementioned meanings.

The free bonds which are present in the above formulae (4e), (4f), (4g), (4h), (4i) and (4n) and result in the azo group, or the azo group in the formulae (4p) and (4q) are in the ortho-position to the hydroxy or amino group. This hydroxy group is preferably bound in the α-position to the naphthalene radical.

Alkyl groups having 1 to 4 carbon atoms are preferably the ethyl group and, in particular, the methyl group; alkoxy groups having 1 to 4 carbon atoms are preferably the ethoxy group and, in particular, the methoxy group; alkanoylamino groups having 2 to 5 carbon atoms are preferably the propionylamino group and, in particular, the acetylamino group, and carbalkoxy groups having 2 to 5 carbon atoms are preferably the carbomethoxy group and the carbethoxy groups.

Of the compounds of the general formula (1) according to the invention, those are especially preferred in which K denotes a radical of the general formula (4c), (4f), (4h), (4p) or (4q) in which, in turn, the individual moieties have the following preferred meanings:

$B^1$ is a carboxy or methyl group;

Q is a phenyl radical which may be substituted by 1 or 2 substituents selected from the following amount of substitutents: 2 methyl, 2 methoxy, 1 chlorine or bromine, 2 sulfo, 1 carboxy and 1 vinylsulfonyl or β-sulfatoethylsulfonyl;

$R^5$ is the acetylamino or propionylamino group, or a benzoylamino group which may be substituted by 1 or 2 substituents from the series comprising chlorine, methyl, methoxy, nitro and sulfo;

R* and R'' are both a hydrogen atom, and the hydroxy group and the —NR*R'' group in the formulae (4p) and (4q) are bound in the peri-position to the naphthalene ring.

Especially preferred compounds of the general formula (1) are those in which K represents the 1-hydroxynaphth-2-yl radical which is substituted by 1, 2 or 3 sulfo groups, or denotes a radical of the general formula (4c) in which $B^1$ is a carboxy or methyl group and Q stands for a phenyl radical which is substituted by 1 or 2 substituents selected from the series comprising 2 methyl groups, 2 ethoxy groups, 2 methoxy groups, 2 sulfo groups, 1 carboxy group or 1 chlorine atom, one of the substituents necessarily being a carboxy or sulfo group, or the phenyl radical being substituted by a vinylsulfonyl or β-sulfatoethylsulfonyl group and optionally additionally by 1 or 2 substituents selected from the series comprising 1 methyl, 2 methoxy, 1 chlorine and 1 sulfo.

The present invention furthermore relates to a process for the preparation of the azo compounds of the general formula (1) according to the invention, for example by coupling a diazonium compound corresponding to the general formula (4)

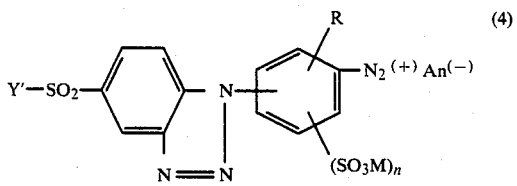

in which $An^{(-)}$ is a colorless anion (or the equivalent of this anion in the case of a polyvalent anion) which is customary for diazonium compounds, such as the chloride, sulfate or bisulfate anion, and Y' has one of the meanings of Y or is the β-hydroxyethyl group, and R, M and n have the abovementioned meanings, with a coupling component of the general formula H-K where K has the abovementioned meaning; as long as K, as stated above, is a bivalent coupling component, a disazo compound can be prepared, if desired, by reacting this bivalent coupling component with twice the equimolar amount of the diazo component. Where a compound (4) where Y' is a β-hydroxyethyl group is used, this β-hydroxyethyl group is converted, in the azo compound formed, into a Y group of the azo compound (1) according to the invention, as stated below.

The diazonium compound of the general formula (4) can be prepared analogously to the procedures which are customary in diazotization reactions by reacting an amino compound of the general formula (5)

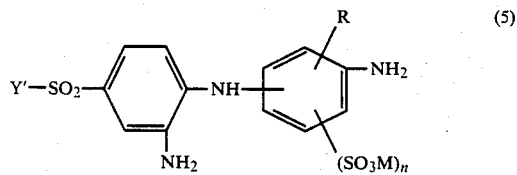

in which Y', R, M and n have the abovementioned meanings, with twice the equimolar amount of a diazotizing agent, such as, for example, nitrous acid or sodium nitrite in the presence of a strong mineral acid, such as hydrochloric acid. In this diazotization reaction of the amino compound of the general formula (5), diazotization of the terminal amino group is accompanied by diazotization of the primary amino group of the ortho-phenylenediamine moiety, resulting in immediate benzotriazole ring closure.

The process according to the invention for the preparation of azo compounds (1) by diazotization and coupling can therefore also be carried out in an advantageous fashion by reacting an amino compound of the general formula (5) with twice the equimolar amount of the diazotizing agent to give the diazonium compound of the amine of the general formula (4), and then coupling the latter with a coupling component of the general formula H-K.

The diazotization and coupling reactions take place in a customary and long-known manner, thus the diazotization generally at a temperature between −5° C. and +15° C. and at a pH of less than 2 by means of a strong acid and alkali metal nitrite in a preferably aqueous medium, and the coupling reaction generally at a pH between 1.5 and 4.5 in the case of an amino group-containing coupling component and at a pH between 3 and 7.5 in the case of a hydroxy group-containing coupling component, and at a temperature between 0° and 30° C. in a preferably aqueous medium.

If the coupling component is a dicouplable, bivalent compound, it contains, for example, a couplable amino group and simultaneously a couplable hydroxy group; for the preparation of a disazo compound, the coupling can thus initially take place by means of the first mole of the diazonium compound of the amine in the acidic pH region to give the monoazo compound, and the second coupling reaction subsequently by means of the second mole of the diazonium compound of the amine in the slightly acidic to slightly alkaline region. This procedure applies, for example, to the compounds corresponding to the general formulae (4p) and (4q), thus by coupling the aminonaphtholsulfonic acid initially with the first mole of the diazonium compound of the amine of the general formula (4) or another aromatic amine corresponding to the general formula D*—NH₂ where D* has an abovementioned meaning other than D, in an acidic medium, and then by coupling the monoazo compound formed with the second mole of a diazonium compound with an amine D*—NH₂ where D* has the abovementioned meaning, in the slightly acidic, neutral or slightly alkaline region, D* necessarily having one of the abovementioned meanings for D, so long as the first coupling reaction has not been carried out using a diazonium compound of an amine (4), thus, in particular, initially at a pH of about 1 to 2.5 and subsequently at a pH between 4 and 6.5, it being possible to carry out the first and second coupling reaction in one and the same batch, initially in the specified acidic region and then in the slightly acidic to slightly alkaline region, so long as the diazonium compound of the amino compound (4) is identical in the two coupling reactions. To prepare a disazo compound corresponding to the general formula (4r), the reaction of the coupling component resorcinol with the diazonium compound(s) is advantageously carried out initially at a pH between 0.8 and 2 and then at a pH between 6 and 7.5.

Disazo compounds corresponding to the general formula (1) whose coupling component K contains an azo group, and is thus the radical of an azo compound which is constructed from a coupling component and a couplable diazo component, such as, for example, the radical of a coupling component corresponding to the general formula (4s) or (4t), can also be prepared according to the invention by initially coupling the diazonium compound of an amine (4) with the amino group-containing, and thus diazotizable, coupling component, such as, for example, the analine or sulfoaminonaphthalene components which are substituted by the substituents $R^6$ and $R^7$ in the formulae (4s) and (4t), and diazotizing the amino group in the amino-azo compound thus formed and coupling the product with a coupling component, such as, for example, the coupling component H-K*, to form the disazo compound.

All these possible reactions for the synthesis of disazo compounds are analogous to synthetic methods for disazo compounds which are known in the literature or known to those skilled in the art.

Coupling components of the general formula (6) or (6a) which can be used for the preparation of the dyes according to the invention and correspond, for example, to the general formulae (4a) to (4n) are, for example: 1,3-diaminobenzene-5-sulfonic acid, phenol, cresol, resorcinol, 2-ethoxyphenol, 4-methylphenol, 3-sulfophenol, salicylic acid, 3-sulfonaphthol, 4-sulfonaphthol, 5-sulfonaphthol, 3,6-disulfo-8-naphthol, 4,6-disulfo-8-naphthol, 1-naphthol-3,8-disulfonic acid, 1-amino-8-naphthol-4-sulfonic acid, 1-amino-8-naphthol-5-sulfonic acid, 1-amino-8-naphthol-2,4-disulfonic acid, 2-amino-5-naphthol-7-sulfonic acid, 2-amino-5-naphthol-1,7-disulfonic acid, 1-amino-5-naphthol-7-sulfonic acid, 2-amino-8-naphthol-6-sulfonic acid, 2-amino-8-naphthol-3,6-disulfonic acid, 2-amino-8-naphthol-4,6-disulfonic acid, 1-amino-8-naphthol-3,6- or -4,6-disulfonic acid, 1-acryloylamino-8-naphthol-3,6- or -4,6-disulfonic acid, 1-propionylamino-8-naphthol-3,6-disulfonic acid, 1-acetylamino-8-naphthol-4-sulfonic acid, 1-acetylamino-8-naphthol-3,6- or -4,6-disulfonic acid, 1-benzoylamino-8-naphthol-3,6- or -4,6-disulfonic acid, 2-naphthol-5,7-disulfonic acid, 2-naphthol-3,6- and -6,8-disulfonic acid, 1,8-dihydroxynaphthalene-3,6-disulfonic acid, 1,8-dihydroxynaphthalene-6-sulfonic acid, 1-naphthol-3,6,8-trisulfonic acid, 2-acetylamino-5-naphthol-7-sulfonic acid, 2-benzoylamino-8-naphthol-6-sulfonic acid, 2-(p'-tosylamino)-5-naphthol-7-sulfonic acid, 2-acetylamino-8-naphthol-3,6-disulfonic acid, 2-acetylamino-5-naphthol-1,7-disulfonic acid, 2-benzoylamino-8-naphthol-6-sulfonic acid, 2-phenylsulfonylamino-5-naphthol-7-sulfonic acid, 2-(N-methyl-N-acetyl)amino-8-naphthol-6-sulfonic acid, N-ethyl-N-benzylaniline-3-sulfonic acid, N,N-bis($\beta$-hydroxyethyl)-aniline, N,N-bis(-$\beta$-sulfatoethyl)-aniline, N,N-bis-($\beta$-hydroxyethyl)-2-methoxy-5-chloroaniline, N-(8-sulfatoethyl)-2,5-dimethoxyaniline, N-($\beta$-sulfatoethyl)-2-chloroaniline, acetoacetyl-2-naphthylamide-5-sulfonic acid, N-acetoacetylaniline-3- or -4-sulfonic acid, N-acetoacetyl-2-methoxy-5-sulfoaniline, N-acetoacetyl-4-methoxy-3-sulfoaniline, N-acetoacetyl-2-methoxy-5-methyl-4-sulfoaniline, N-acetoacetyl-2,5-dimethoxy-4-sulfoaniline, 1-(4'-sulfophenyl)-3-methyl-5-pyrazolone, 1-(4'-sulfophenyl)-3-carboxy-5-pyrazolone, 1-(2'-chloro-5'-sulfophenyl)-3-methyl- or -3-carboxy-5-pyrazolone, 1-(3'-sulfophenyl)-3-carboxy-5-pyrazolone, 1-(2'-methoxy-4'-sulfophenyl)-3-carboxy-5-pyrazolone, 1-(3'-sulfophenyl)-3-methyl-5-aminopyrazole, 1-(4'-sulfophenyl)-3-methyl-5-aminopyrazole, 1-(2'-methoxy-5'-sulfophenyl)-3-methyl-5-aminopyrazole, 1-(2'-methoxy-5'-methyl-4'-sulfophenyl)-3-methyl-5-aminopyrazole, 1-(2'-chloro-5'-sulfophenyl)-3-methyl-5-aminopyrazole, 1-(3'-amino-4'-sulfophenyl)-3-carbethoxy-5-pyrazolone, 1-(2',4', 6'-trimethyl-3'-amino-5'-sulfophenyl)-3-carbethoxy-5-pyrazolone, 1-(3'-amino-6'-methylphenyl)-3-carboxy-5-pyrazolone, 2-N-methylamino-8-naphthol-6-sulfonic acid, 3-carboxy-5-pyrazolone, 1-phenyl-3-carboxy-5-pyrazolone, 1-(4'-nitrophenyl)-3-carboxy-5-pyrazolone, 1-(3'-acetylaminophenyl)-3-carboxy-5-pyrazolone, 1-(3'-carboxyphenyl)-3-methyl-5-pyrazolone, 2,3-hydroxynaphthoic acid, 8-hydroxyquinoline-5-sulfonic acid, 1,4-dimethyl-2-hydroxy-6-pyridone-5-sulfonic acid, aniline-N-methanesulfonic acid, 2-amino-5-naphthol-7-sulfonic acid, 2-methylamino-8-naphthol-6-sulfonic acid, diphenylamino-2,5-disulfonic acid and diphenylamino-4'-sulfonic acid.

The compounds which can be employed according to the invention for the synthesis of the azo compounds (1) according to the invention and which correspond to the general formulae (4) and (5) were hitherto unknown. The invention thus also relates to these compounds, a process for their preparation, and their use for the synthesis of dyes, such as, in particular, to the azo compounds (1) according to the invention. They can be prepared analogously to known procedures for the reaction of nitrochlorobenzenes with amines, thus, for example, initially by reacting 2-chloro-5-($\beta$-hydroxyethylsulfonyl)nitrobenzene with a compound of the general formula (6)

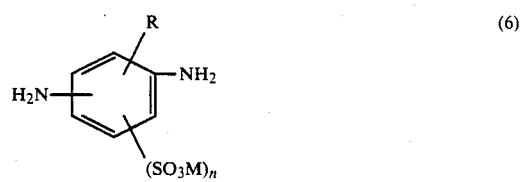

in which R, M and n have the abovementioned meanings and the two primary amino groups are bound in the meta- or para-position to one another on the benzene ring. The reaction takes place in solvents or diluents which are customary and suitable for this purpose and in the presence of an acid-binding agent, generally at a temperature between 50° and 80° C. Suitable solvents are, for example, water or an organic solvent or diluent or a mixture of water and a water-miscible organic solvent. Organic solvents or diluents are, for example, water, alkanols having 1 to 6 carbon atoms, preferably having 1 to 4 carbon atoms, such as, for example, methanol, dioxane, toluene, the xylenes, chlorobenzene, o-dichlorobenzene, m-dichlorobenzene, dimethylformamide and N-methylpyrrolidone; the phenylenediamine of the formula (6) can also be used as solvent, in excess.

Acid-binding agents are, for example, potassium carbonate, magnesium oxide, sodium carbonate, sodium hydroxide, triethlamine and triethanolamine. In aqueous medium, a pH between 6 and 12, preferably between 8 and 10, is maintained. Such procedures are known, for example, from the processes for the preparation of substituted phenyl ($\beta$-hydroxyethyl)sulfones (see, for example, German Offenlegungsschrift No. 3,502,991). 2-Chloro-5-($\beta$-hydroxyethylsulfonyl)nitrobenzene itself is described in Example 5 of German Pat. No. 859,462.

Phenylenediamines corresponding to the general formula (6) are, for example, 1,3-diaminobenzene, 1,4-diaminobenzene, 1-sulfo-2,4-diaminobenzene, 1-sulfo-2,5-diaminobenzene, 1-carboxy-2,4-diaminobenzene, 1-carboxy-2,5-diaminobenzene, 1-methyl-2,4-diaminobenzene, 1-methyl-2,5-diaminobenzene, 1-hydroxy-2,4-diaminobenzene, 1-hydroxy-2,5-diaminobenzene, 1-chloro-2,4-diaminobenzene, 1-chloro-2,5-diaminobenzene, 1-methoxy-2,4-diaminobenzene and 1-methoxy-2,5-diaminobenzene.

The likewise novel nitroaniline compounds according to the invention which correspond to the general formula (7)

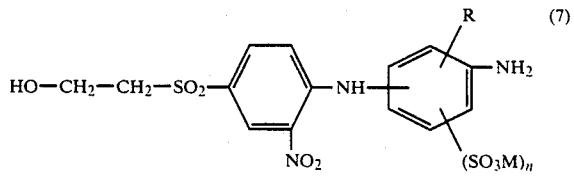

in which R, M and n have the abovementioned meanings, and are obtainable according to the invention in this way are then, after they have been isolated, for example, from the reaction batch by crystallization or by removing the solvent or excess amine by distillation or by acidification and filtration, reduced to the amino compound corresponding to the general formula (5) analogously to known procedures, thus by catalytic hydrogenation using hydrogen on palladium, platinum or Raney nickel at a temperature between 50° and 110° C. and at increased pressure or by Béchamp reduction using iron in an acidic medium, for example using iron in ethanol/glacial acetic acid. The reduction can take place in a solvent which is suitable for this purpose, such as water, methanol or ethanol or a mixture thereof.

After prior separation from catalysts or metallic reducing agents, the amino compound present in the hydrogenation batch can be diazotized directly, without intermediate isolation, with simultaneous ring closure to form the triazole.

So long as their Y moiety denotes the β-hydroxyethyl group, the compounds of the general formula (1) according to the invention and those of the general formula (5) can subsequently be converted using customary and known procedures into compounds in which Y has a meaning other than the β-hydroxyethyl group, thus, for example, into their ester derivatives, such as, for example, of polyvalent inorganic acids or of aliphatic and aromatic carboxylic or sulfonic acids, thus, for example, into compounds in which X stands for the sulfato, phosphato, thiosulfato, acetyloxy or toluylsulfonyloxy group or for a chlorine atom. Esterifying and acylating agents which are suitable for this purpose are, for example, the appropriate inorganic or organic acids or anhydrides or amides thereof, such as, for example, sulfuric acid, sulfur trioxide-containing sulfuric acid, chlorosulfonic acid, amidosulfonic acid, phosphoric acid, phosphorus oxychloride, mixtures of phosphoric acid and phosphorus pentoxide, acetic anhydride, toluenesulfonyl chloride and thionyl chloride.

Those compounds in which Y stands for the vinyl group can be prepared from their analogous ester derivatives by means of alkali, thus in aqueous medium at a pH of 10 to 12 and a temperature between 40° and 50° C. for 10 to 20 minutes. The synthesis of, for example, β-(dialkylamino)ethylsulfonyl and β-thiosulfatoethylsulfonyl derivatives of the compounds (1), (4) and (5) takes place by reacting the vinylsulfonyl compounds thereof with the appropriate dialkylamine or with an alkali metal salt of the thiosulfuric acid, such as sodium thiosulfate.

All these procedures for converting a $-SO_2-Y$ group into another are known to those skilled in the fiber-reactive area and are described in large number in the literature.

The compounds of the general formula (1) according to the invention—called compounds (1) below—have fiber-reactive properties and have very valuable dye properties. They can therefore be used for dyeing (including printing) hydroxy group-containing and/or carboxamide group-containing materials. It is also possible to use the solutions produced in the synthesis of the compounds (1) directly in dyeing as a liquid preparation, if appropriate after addition of a buffer substance and if appropriate also after concentration.

They can be precipitated and isolated from the aqueous synthesis solutions by generally known methods for water-soluble compounds, thus, for example, by precipitation from the reaction medium by means of an electrolyte, such as, for example, sodium chloride or potassium chloride, or alternatively by evaporating the reaction solution itself, for example by spray drying. If the last mentioned type of isolation is selected, it is often advisable to remove before evaporation any amounts of sulfate present in the solutions by precipitation as calcium sulfate and removal by filtration.

The present invention therefore also relates to the use of the compounds (1) for dyeing (including printing) hydroxy and/or carboxamide group-containing materials and to methods for application thereof to these substrates. The materials are preferably used in the form of fiber materials, in particular in the form of textile fibers, such as yarns, wound packages and fabrics. It is possible here to proceed analogously to known procedures.

Hydroxy group-containing materials are those of natural or synthetic origin, such as, for example, cellulose fiber materials or their regenerated products and polyvinyl alcohols. Cellulose fiber materials are preferably cotton, but also other vegetable fibers, such as linen, hemp, jute and ramie fibers; regenerated cellulose fibers are, for example, staple viscose rayon and filament viscose rayon.

Carboxamide group-containing materials are, for example, synthetic and natural polyamides and polyurethanes, in particular in the form of fibers, for example wool and other animal hairs, silk, leather, nylon-6,6, nylon-6, nylon-11 and nylon-4.

The compounds (1) can be applied and fixed, in accordance with the use according to the invention, to the substrates mentioned, in particular to the fiber materials mentioned, by application techniques which are known for watersoluble dyes, in particular fiber-reactive dyes, for example by applying the compound (1) in dissolved form onto the substrate or introducing it into the substrate and fixing it thereon or therein, if appropriate through the action of heat and/or if appropriate through the action of an alkaline agent. Such dyeing and fixing methods are described in large number in the literature (see, for example, European Patent Application Publication No. 0,181,585 A2).

The dyeings according to the invention, in particular on cellulose fiber materials, have good light fastness properties both when the dyeing is dry and in the wet state, for example moistened by a perspiration solution, and good wet fastness properties, such as, for example, good wash fastness properties at 60 to 95oC, even in the presence of perborates, acid and alkaline fulling, cross-dyeing and perspiration fastness properties, good acid and alkaline perspiration fastness properties, a high steam resistance, good alkali, acid, water and seawater fastness properties, and good pleating fastness, hot-press fastness and rub fastness properties. They also have good resistance to acid fading on storage of moist dyed material still containing acetic acid.

The Examples which follow serve to illustrate the invention. Parts are parts by weight, and percentages are percentages by weight, unless otherwise stated. Parts by weight are to parts by volume as the kilogram is to the liter.

The compounds described in these Examples by means of their formulae are specified in the form of the free acids; in general, they are prepared and isolated in the form of their sodium or potassium salts and used for dyeing in the form of their salts. The starting compounds and components mentioned in the Examples which follow, in particular tabulated Examples, in the form of the free acid can likewise be employed in the synthesis as such or in the form of their salts, preferably alkali metal salts, such as sodium salts or potassium salts. The absorption maxima ($\lambda_{max}$ values) in the visible region for the alkali metal salts of the compounds (1) were determined in aqueous solution.

EXAMPLE 1

(a) A solution of 266 parts of 2-chloro-5-($\beta$-hydroxyethylsulfonyl)nitrobenzene in 750 parts of dioxane is added over the course of 30 minutes, while stirring, to a solution having a pH of 8 and a temperature of 50° C. of 188 parts of 1,3-diaminobenzenesulfonic acid in 500 parts of an approximately 60% strength aqueous sodium hydroxide solution while maintaining a temperature of 50° C., and the batch is stirred for a further one hour at 50° C., then for one hour at 60° C. and further for about 8 to 10 hours at 80° C., until starting material can no longer be detected by thinlayer chromatography. The batch is then cooled to a temperature of 0° to 5° C. and adjusted to a pH of 1 using about 300 parts of concentrated aqueous hydrochloric acid.

The 2-amino-4-[2'-nitro-4'-($\beta$-hydroxyethylsulfonyl)phenylamino]benzenesulfonic acid formed precipitates as the yellow ammonium salt. It is filtered off, washed with aqueous 2 N hydrochloric acid and dried.

The ammonium salt has a melting point of 234° C. and exhibits the following C,H,N analysis:
Cal.: C: 37.0%, H: 3.3%, N:9.2%, Found: C: 37.4%, H:3.5%, N:9.0%,
with an empirical formula of $C_{14}H_{15}N_3O_8S_2 \cdot HCl$.

(b) 455 parts of the aminonitrodiphenylamine compound prepared under a) are dissolved in 2,500 parts of a mixture of equal parts of ethanol and water and reduced catalytically, for example by means of hydrogen over 50 parts of Raney nickel at a hydrogen pressure of 50 bar and a temperature of 100° C. When the reaction is complete, the catalyst is removed at 50° C. by filtration, and the filtrate is cooled to a temperature of 0° C. to 5° C. and adjusted to a pH of 1 usin 170 parts of concentrated aqueous hydrochloric acid.

The 2-amino-4-[2'-amino-4'-($\beta$-hydroxyethylsulfonyl)phenylamino]benzenesulfonic acid formed precipitates as the diammonium salt. It is isolated by filtration, washed with a little dilute aqueous hydrochloric acid and dried. It has a melting point of 223° C.

(c) 23 parts of the diaminodiphenylamine compound prepared under b) are introduced into a mixture of 50 parts of 100% strength sulfuric acid and 11 parts of 20% strength oleum while stirring at a temperature of 20° C.; the mixture is stirred for a further five hours, and the suspension is then transferred onto 300 parts of ice, the mixture is stirred for a further 3 hours, and the precipitate formed is filtered off under suction and dried. The resultant diammonium salt of 2-amino-4-[2'-amino-4'-$\beta$-sulfatoethylsulfonyl)phenylamino]benzenesulfonic acid has a melting point of 210° C. and exhibits the following C,N analysis:
Found: C 24.0%, N 6.0%,
corresponding to a C:N ratio of 14:3
with an empirical formula of $C_{14}H_{17}N_3O_9S_3 \cdot H_2SO_4$.

(d) 24 parts of the 8-sulfatoethylsulfonyl compound prepared under (c) are dissolved in 100 parts of water and 150 parts of ice. Firstly, 25 parts of aqueous concentrated hydrochloric acid and then, slowly over the course of 60 minutes at a temperature of about 5° C., 20 parts by volume of aqueous 5 N sodium nitrite solution are added to this solution. The batch is stirred at this temperature for a further one hour and the slight excess of nitrite is destroyed, as usual, using amidosulfonic acid.

The resultant diazonium salt of 1-(4'-sulfo-3'-aminophenyl)- 5-($\beta$-sulfatoethylsulfonyl)-1,2,3-benzotriazole can be isolated by adding 1.1 times the amount of ethanol to the reaction solution at 5° C., the diazonium salt depositing as a precipitate, which is filtered off under suction, washed with a little ethanol and dried.

The diazonium salt exhibits an IR band for the diazonium group at 2180 cm$^{-1}$.

EXAMPLE 2

The preparation of an azo compound according to the invention proceeds directly from the diazonium salt solution, described under Example 1d), of the aminophenylbenzotriazole compound, by adding 14.4 parts of 3-carboxy-1-(4'-sulfophenyl)-5-pyrazolone over the course of 10 minutes while stirring at a temperature of 0° to 10° C. and while maintaining a pH of 4 to 4.5 by means of sodium carbonate. The batch is stirred for a further 3 hours, 10 parts of kieselguhr are subsequently added, the batch is filtered, and the resultant azo compound according to the invention is salted out from the filtrate using sodium chloride in an amount of 20% of the filtrate volume.

After filtration and drying, a yellow electrolyte salt-containing (sodium chloride-containing) powder of the sodium salt of the compound

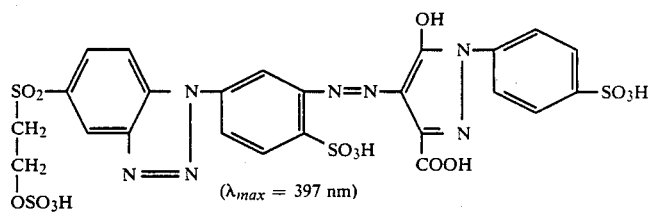

is obtained which has very good fiber-reactive dye properties and dyes the fiber materials mentioned in the description, such as, in particular, cellulose fiber materials, for example cotton, in intense yellow, fast shades having a ood degree of fixing, by the application methods which are customary in industry for fiber-reactive dyes. Of the good fastness properties of the dyeings and prints obtainable using the azo compound according to the invention, the wash fastness properties at 60° C. and 95° C. and the light fastness and perspiration light fastness properties, in particular, may be emphasized. The compound according to the invention is also distinguished by high tinctorial strength.

EXAMPLE 3 23 parts of the diammonium salt of 2-amino-4-[2'-amino-4'-(β-hydroxyethylsulfonyl)-phenylamino]benzenesulfonic acid (see Example 1b) are suspended in a mixture of 200 parts of water and 25 parts of concentrated aqueous hydrochloric acid, 100 parts of ice and subsequently, over the course of one hour while stirring at a temperature of between 0° and 5° C., 21 parts by volume of aqueous 5 N sodium nitrite solution are added to the suspension. Excess nitrite is subsequently destroyed using amidosulfonic acid. 14.4 parts of 3-methyl-1-(β-hydroxyethylsulfonylphenyl)-5-pyrazolone are added over the course of 10 minutes to this diazonium salt solution of 1-(4'-sulfo-3'-aminophenyl)-5-(8-hydroxyethylsulfonyl)-1,2,3-benzotriazole at a temperature between 0° and 10° C. while maintaining a pH of 4 to 4.5. The coupling reaction is carried out to completion while stirring for 3 hours, the batch is clarified using 10 parts of kiesel guhr, and the resultant β-hydroxyethylsulfonyl-monoazo compound according to the invention is precipitated, filtered off and dried.

The dried product is introduced into a mixture of 100 parts of sulfuric acid monohydrate and 22 parts of 10% strength oleum at a temperature between 10° and 15° C.; the batch is stirred for a further 4 hours and then transferred onto 400 parts of ice while stirring. 200 parts of calcium carbonate are subsequently added in order to set a pH of 4.5, the entire mixture is warmed to 60° C., the precipitated calcium sulfate is filtered off under suction and washed with 200 parts of hot water, and sodium chloride in an amount of 20%, relative to the volume of the total filtrate, is added to the combined filtrates. The mixture is stirred for a further 4 hours, and the azo compound according to the invention is filtered off in the form of the sodium chloride-containing sodium salt.

It has the formula

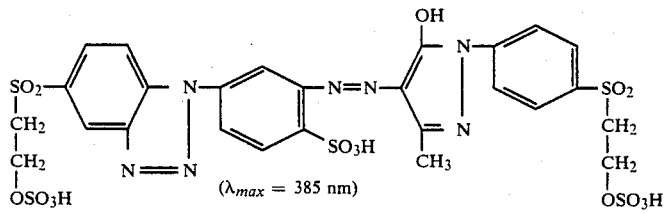
($\lambda_{max}$ = 385 nm)

written in the form of the free acid, and exhibits very good fiber-reactive dye properties. Using the application and fixing methods which are customary in industry, it dyes, in particular, cellulose fiber materials in intense yellow shades having good fastness properties, of which, in particular, the good wash fastness properties at 60° C. and 95° C. and the light fastness and perspiration light fastness properties may be emphasized.

EXAMPLES 4 to 53

In the following tabulated Examples, further azo compounds corresponding to the general formula (A)

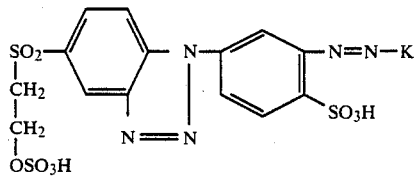

(A)

written in the form of the free acid, according to the invention are written with the aid of their coupling component H-K. They can be prepared in a manner according to the invention, or example in accordance with the working Examples above by coupling the specified coupling component with the diazonium salt of 1-(4'-sulfo-3'-aminophenyl)-5-(β-hydroxy- or -β-sulfatoethylsulfonyl)-1,2,3-benzotriazole, if necessary with subsequent sulfation, and likewise have very good fiber-reactive dye properties. They give intense dyeings and prints on the materials mentioned in the description, such as, in particular, cellulose fiber materials, using the application and fixing methods which are customary for fiber-reactive dyes, with the hue specified in the particular tabulated Example (here on cotton) having good fastness properties; the values given in parentheses are the absorption maxima ($\lambda_{max}$) in nm.

| Ex. | Coupling component H-K in formula (A) | Hue |
|---|---|---|
| 4 | 4,6-Disulfo-1-acetylamino-8-naphthol | red (510) |
| 5 | 3,6-Disulfo-2-amino-naphthalene | orange (473) |
| 6 | 5,7-Disulfo-2-amino-naphthalene | bluish red (543) |
| 7 | 4-Sulfo-1-naphthol | orange (485) |
| 8 | 3,6-Disulfo-1-naphthol | orange (483) |
| 9 | 1-(N-β-Sulfoethyl)-4-methyl-2-hydroxy-6-pyridone | yellow (407) |
| 10 | 3,6,8-Trisulfo-2-amino-naphthalene | orange (453) |
| 11 | 6-Sulfo-3-acetylamino-8-naphthol | orange (461) |
| 12 | N,N-Bis-(β-sulfatoethyl)-aniline | yellow-brown (437) |
| 13 | N-Ethyl-N-(β-sulfatoethyl)-aniline | yellow-brown (453) |
| 14 | 6-Sulfo-2-acetylamino-8-naphthol | orange (464) |
| 15 | 3,6-Disulfo-1-benzoylamino-8-naphthol | red (503) |
| 16 | 4,6-Disulfo-1-benzoylamino-8-naphthol | red (504) |
| 17 | N,N-Bis-(β-sulfatoethyl)-3-chloro-aniline | yellow (444) |
| 18 | 5-Sulfo-1-naphthol | orange (470) |
| 19 | 3,6-Disulfo-1-amino-2-{2'-sulfo-5'-[5''-(β-sulfoethylsulfonyl)-1'',2'',3''-benzotriazol-1''-yl]-phenyl-diazoyl}-8-naphthol | navy blue (600) |
| 20 | 3,6-Disulfo-1-amino-2-[4'-(β-sulfatoethylsulfonyl)-phenyl-diazoyl]-8-naphthol | navy blue (585) |
| 21 | 6-Sulfo-2-methylamino-8-naphthol | orange (471) |
| 22 | 4-Sulfo-diphenylamine | orange |
| 23 | 5-Sulfo-2-acetylamino-7-naphthol | orange |
| 24 | 3,6-Disulfo-2-acetylamino-8-naphthol | bluish red |
| 25 | 2,4-Disulfo-1-amino-8-naphthol | violet |
| 26 | 3,6-Disulfo-1-amino-8-naphthol (coupled in the 7-position) | violet |
| 27 | 4,6-Disulfo-1-amino-8-naphthol (coupled in the 7-position) | violet |
| 28 | 3,6-Disulfo-1-phenylureido-8-naphthol | bluish red |

-continued

| Ex. | Coupling component H-K in formula (A) | Hue |
|---|---|---|
| 29 | 3-Sulfo-1-naphthol | orange |
| 30 | 5-Sulfo-2-naphthol | red |
| 31 | 6-Sulfo-2-naphthol | red |
| 32 | 8-Sulfo-2-naphthol | red |
| 33 | 3,6-Disulfo-1-acetylamino-8-naphthol | bluish red |
| 34 | N,N-Bis-(β-hydroxyethyl)-aniline | orange |
| 35 | 4,6-Disulfo-1-phenylureido-8-naphthol | |
| 36 | 3,6,8-Trisulfo-1-naphthol | red |
| 37 | 3,6-Disulfo-2-naphthol | orange |
| 38 | 3,6-Disulfo-1-acetylamino-8-naphthol | bluish red |
| 39 | 4,6-Disulfo-1-acetylamino-8-naphthol | bluish red |
| 40 | N-Ethyl-N-(3'-sulfobenzyl)-aniline | orange |
| 41 | 5-Sulfo-1,4-dimethyl-2-hydroxy-6-pyridone | yellow |
| 42 | 2-Carboxy-acetoacetylaniline | yellow |
| 43 | 5-Sulfo-8-hydroxy-quinoline | orange |
| 44 | 3-Sulfo-acetoacetylaniline | yellow |
| 45 | 1-(4'-Sulfophenyl)-3-methyl-5-pyrazolone | yellow |
| 46 | 1-(4'-Sulfophenyl)-3-carbethoxy-5-pyrazolone | |
| 47 | 1-(2'-chloro-5'-sulfophenyl)-3-methyl-5-pyrazolone | yellow |
| 48 | 1-(2',5'-Disulfophenyl)-3-methyl-5-pyrazolone | yellow |
| 49 | 1-(4',8'-Disulfo-naphth-2'-yl)-3-methyl-5-pyrazolone | yellow |
| 50 | 1-(4'-Sulfophenyl)-3-methyl-5-aminopyrazole | yellow |
| 51 | 3,6-Disulfo-1-[4'-chloro-6'-(3''-sulfophenyl)-amino-1',3',5'-triazin-2'-yl]-amino-8-naphthol | bluish red (516) |
| 52 | 3,6-Disulfo-1-{4'-chloro-6'-]4''-(β-sulfatoethylsulfonyl)-phenyl]-amino-1',3',5'-triazin-2'-yl}-amino-8-naphthol | bluish red (512) |
| 53 | 6,8-Disulfo-2-naphthol | orange |

EXAMPLE 54

(a) 188 parts of 1,4-diaminobenzenesulfonic acid are reacted by the procedure given in Example 1a) with 266 parts of 2-chloro-5-(β-hydroxyethylsulfonyl)-nitrobenzene. When the reaction is complete, the batch is cooled to 0° to 5° C. and adjusted to a pH of 1 using about 300 parts of concentrated aqueous hydrochloric acid. The 2-amino-5-[2'-nitro-4'-(β-hydroxyethylsulfonyl)-phenylamino]benzenesulfonic acid formed precipitates as the yellow ammonium salt. It is filtered off, washed with aqueous 2 N hydrochloric acid and dried. It has a melting point of 204° C. and exhibits the following C,H,N analysis:
Cal.: C:37.0%, H:3.3%, N;9.2%, Found: C:37.0%, H: 3.4%, N: 9.2%,
with an empirical formula of $C_{14}H_{15}N_3O_8S_2 \cdot HCl$.

(b) 455 parts of the aminonitrodiphenylamine compound prepared under (a) are reduced using the procedure given in Example (1b). When the reaction is complete, the catalyst is removed by filtration at 50°) C., and the filtrate is cooled to a temperature of 0° C. to 5° C. and adjusted to a pH of 1 using 170 parts of concentrated aqueous hydrochloric acid. The 2-amino-5-[2'-amino-4'-(8-hydroxyethylsulfonyl)phenylamino]benzenesulfonic acid formed precipitates as the diammonium salt. It is isolated by filtration, washed with a little dilute aqueous hydrochloric acid and dried. It has a melting point of 254° C.

(c) 23 parts of the diaminodiphenylamine compound prepared under (b) are introduced with stirring into a mixture of 50 parts of 100% strength sulfuric acid and 11 parts of 20% strength oleum at a temperature of about 20° C.; the mixture is stirred for a further 5 hours and the suspension is then transferred onto 300 parts of ice, the mixture is stirred for a further 3 hours, and the precipitate formed is filtered off under suction and dried.

The resultant diammonium salt of 2-amino-5-[2'-amino-4'-(8-sulfatoethylsulfonyl)phenylamino]benzenesulfonic acid has a melting point of 180° C. and exhibits the following C,N analysis:
Found: C 29.4%, N 7.4%,
corresponding to a C:N ratio of 14:3
with an empirical formula of $C_{14}H_{17}N_3O_9S_3 \cdot H_2SO_4$.

(d) 24 parts of the β-sulfatoethylsulfonyl compound prepared under (c) are dissolved in 100 parts of water and 150 parts of ice. 25 parts of aqueous concentrated hydrochloric acid and then, slowly over the course of 60 minutes at a temperature of about 5° C., 20 parts by volume of aqueous 5 N sodium nitrite solution are added to this solution The batch is stirred at this temperature for about 1 hour and the slight excess of nitrite is destroyed, as usual, using amidosulfonic acid.

The resultant diazonium salt of 1-(4'-sulfo-3'-aminophenyl)-5-(8-sulfatoethylsulfonyl)-1,2,3-benzotriazole can be isolated by adding 1.1 times the amount of ethanol to the reaction solution at 5° C., the diazonium salt depositing as a precipitate, which is filtered off under suction, washed with a little ethanol and dried.

The diazonium salt exhibits a sharp IR band for the diazonium group at 2235 cm$^{-1}$.

EXAMPLE 55

The preparation of an azo compound according to the invention proceeds directly from the diazonium salt solution described under Example 54d), by adding 15.8 parts of 1-naphthol-5-sulfonic acid over the course of 10 minutes with stirring at a temperature of 0° to 10° C. while maintaining a pH of 4 to 4.5 by means of sodium carbonate. The batch is stirred for a further 4 hours, 10 parts of kieselguhr are subsequently added, the batch is filtered, and the resultant azo compound according to the invention is salted out of the filtrate using sodium chloride in an amount of 15% of the filtrate volume.

After filtration and drying, a red electrolyte salt-containing (sodium chloride-containing) powder of the sodium salt of the compound

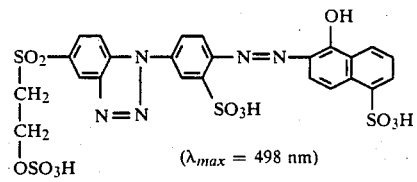

is obtained which has very good fiber-reactive dye properties and dyes the fiber materials mentioned in the description, such as, in particular, cellulose fiber materials, for example cotton, in intense red, true shades having a high degree of fixing using the application methods which are customary in industry for fiberreactive dyes. Of the good fastness properties of the dyeings and prints obtainable using this azo compound according to the invention, the wash fastness properties at 60° C. and 95° C. and the light and alkaline perspiration light fastness properties, in particular, may be emphasized.

EXAMPLE 56 23 parts of the diammonium salt of 2-amino-5-[2'-amino-4'-(β-hydroxyethylsulfonyl)-phenylamino]benzenesulfonic acid (see Example 54b) are suspended in a mixture of 200 parts of water and 25 parts of concentrated aqueous hydrochloric acid, 100 parts of ice and subsequently, over the course of one hour with stirring at a temperature between 0° and 5° C., 21 parts by volume of aqueous 5 N sodium nitrite solution are added to the suspension. Excess nitrite is subsequently destroyed using amidosulfonic acid. 16.5 parts of 1-naphthol-4-sulfonic acid are added to this diazonium salt solution of 1-(4'-sulfo-3'-aminophenyl)-5-(β-hydroxyethylsulfonyl)-1,2,3-benzotriazole over the course of 10 minutes at a temperature between 0 and 10° C. while maintaining a pH of 4 to 4.5. The coupling reaction is continued to completion while stirring for 3 hours, the batch is clarified using 10 parts of kieselguhr at 70° C., and the β-hydroxyethylsulfonylmonoazo compound formed is precipitated by means of sodium chloride, filtered off and dried.

The dried product is introduced into a mixture of 50 parts of sulfuric acid monohydrate and 11 parts of 20% strength oleum at a temperature between 10° and 15° C.; the batch is stirred for about 5 hours and then transferred onto 400 parts of ice, 160 parts of calcium carbonate are subsequently added in order to set a pH of 5 to 5.5, the mixture is stirred for a further one hour, the entire mixture is warmed to 50° C., the calcium sulfate precipitate is filtered off under suction and washed with 200 parts of hot water, and sodium chloride in an amount of 10%, relative to the volume of the total filtrate, is added to the combined filtrates. The mixture is stirred for a further 4 hours and the azo compound according to the invention is filtered off in the form of the sodium chloride-containing sodium salt.

It has the formula

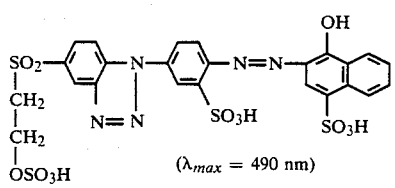

($\lambda_{max}$ = 490 nm)

written in the form of the free acid, and exhibits very good fiber-reactive dye properties It dyes, in particular, cellulose fiber materials using the application and fixing methods which are customary in industry, in intense, scarlet shades having good fastness properties, of which, in particular, the good wash fastness properties at 60° C. and 95° C. and the good perspiration light fastness properties may be emphasized.

EXAMPLES 57 to 104

In the following tabulated Examples, further azo compounds corresponding to the general formula (B)

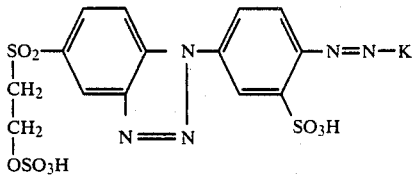

(B)

written in the form of the free acid, according to the invention are written with the aid of their coupling component H-K. They can be prepared in a manner according to the invention, for example in accordance with the working Examples above by coupling the specified coupling component with the diazonium salt of 1-(3'-sulfo-4'-aminophenyl)-5-(β-hydroxy- or β-sulfatoethylsulfonyl)1,2,3-benzotriazole, if necessary with subsequent sulfation, and likewise have very good fiber-reactive dye properties. They give intense dyeings and prints on the materials mentioned in the description, such as, in particular, cellulose fiber materials, using the application and fixing methods which are customary for fiber-reactive dyes, having the hue (here on cotton) specified in the particular tabulated Example having good fastness properties; the values given in parentheses are the absorption maxima ($\lambda_{max}$) in nm.

| Ex. | Coupling component H-K in formula (B) | Hue |
| --- | --- | --- |
| 57 | 4,6-Disulfo-1-acetylamino-8-naphthol | red (504) |
| 58 | 3,6-Disulfo-1-naphthol | orange (488) |
| 59 | 1-(N-Sulfoethyl)-4-methyl-2-hydroxy-6-pyridone | yellow (415) |
| 60 | 6-Sulfo-3-acetylamino-8-naphthol | orange (474) |
| 61 | 6-Sulfo-2-acetylamino-8-naphthol | red-orange (487) |
| 62 | 1-(4'-Sulfophenyl)-3-methyl-5-pyrazolone | yellow (393) |
| 63 | 3,6,8-Trisulfo-2-amino-naphthalene | orange (460) |
| 64 | 3,6-Disulfo-2-amino-naphthalene | orange (476) |
| 65 | 5,7-Disulfo-2-amino-naphthalene | violet (548) |
| 66 | 6-Sulfo-2-methylamino-8-naphthol | orange (475) |
| 67 | N,N-Bis-(β-sulfatoethyl)-aniline | yellow-brown (439) |
| 68 | N-Ethyl-N-(β-sulfatoethyl)-aniline | yellow-brown (457) |
| 69 | 3,6-Disulfo-1-benzoylamino-8-naphthol | red (510) |
| 70 | 4,6-Disulfo-1-benzoylamino-8-naphthol | red (509) |
| 71 | N,N-Bis-(β-sulfatoethyl)-3-chloro-aniline | yellow (449) |
| 72 | 3,6-Disulfo-1-amino-2-{2'-sulfo-4'-[5''-(β-sulfatoethylsulfonyl)-1'',2'',3''-benzotriazol-1'''-yl]-phenyl-diazoyl}-8-naphthol | navy blue (596) |
| 73 | 3,6-Disulfo-1-amino-2-[4'-(β-sulfatoethylsulfonyl)-phenyl-diazoyl]-8-naphthol | navy blue (602) |
| 74 | 5-Sulfo-2-acetylamino-7-naphthol | orange |
| 75 | 3,6-Disulfo-2-acetylamino-8-naphthol | bluish red |
| 76 | 2,4-Disulfo-1-amino-8-naphthol | violet |
| 77 | 3,6-Disulfo-1-amino-8-naphthol (coupled in the 7-position) | violet |
| 78 | 4,6-Disulfo-1-amino-8-naphthol | violet |
| 79 | 3,6-Disulfo-1-phenylureido-8-naphthol | bluish red |
| 80 | 3-Sulfo-1-naphthol | orange |
| 81 | 5-Sulfo-2-naphthol | red |
| 82 | 6-Sulfo-2-naphthol | red |
| 83 | 8-Sulfo-2-naphthol | red |
| 84 | 3,6-Disulfo-1-acetylamino-8-naphthol | bluish red |
| 85 | 4,6-Disulfo-1-phenylureido-8-naphthol | bluish red |
| 86 | 3,6,8-Trisulfo-1-naphthol | red |
| 87 | 3,6-Disulfo-2-naphthol | red |
| 88 | 6,8-Disulfo-2-naphthol | orange |
| 89 | 3-Sulfo-acetoactylaniline | yellow |
| 90 | 1-(4'-Sulfophenyl)-3-carboethoxy-5-pyrazolone | yellow |
| 91 | 1-(4'-Sulfophenyl)-3-carboxy-5-pyrazolone | yellow (406) |
| 92 | 1-(2'-chloro-5'-sulfophenyl)-3-methyl-5-pyrazolone | yellow |
| 93 | 1-(2',5'-Disulfophenyl)-3-methyl-5- | yellow |

| Ex. | Coupling component H-K in formula (B) | Hue |
|---|---|---|
| | pyrazolone | |
| 94 | 1-(4',8'-Disulfo-naphth-2'-yl)-3-methyl-5-pyrazolone | yellow |
| 95 | 1-(4'-Sulfophenyl)-3-methyl-5-amino-pyrazole | yellow |
| 96 | 5-Sulfo-1,4-dimethyl-2-hydroxy-6-pyridone | yellow |
| 97 | 2-Carboxyacetoacetylaniline | yellow |
| 98 | 5-Sulfo-8-hydroxy-quinoline | orange |
| 99 | N-Ethyl-N-(3'-sulfo-benzyl)-aniline | orange |
| 100 | N,N-Bis-(β-hydroxyethyl)-aniline | orange |
| 101 | 4-Sulfo-diphenylamine | orange |
| 102 | 3,6-Disulfo-1-{4'-chloro-6'-[4''-(β-sulfato-ethylsulfonyl)-phenyl]-amino-1',3',5'-triazin-2-yl}-amino-8-naphthol | bluish red (515) |
| 103 | 3,6-Disulfo-1-[4'-chloro-6'-(3''sulfo-phenyl)-amino-1',3',5'-triazin-2-yl]-amino-8-naphthol | bluish red (516) |
| 104 | 3,6-Disulfo-1-{4'-chloro-6'-[4''-(β-sulfato-ethylsulfonyl)-phenyl]-amino-1',3',5'-triazin-2-yl}-amino-8-naphthol | bluish red (515) |

EXAMPLE 105

A diazonium salt solution, prepared in accordance with Example (1d), of 52 parts of 2-amino-4-[2'-amino-4'-(β-sulfatoethylsulfonyl)phenylamino]benzenesulfonic acid is added to a pH 6 solution of 68 parts of an azo compound constructed in the usual way by an acid coupling reaction from 4-(β-sulfatoethylsulfonyl)aniline as the diazo component and 1-amino-8-napthol-3,6-disulfonic acid as the coupling component, and the second coupling reaction is carried out at a temperature between 15° and 20° C. while maintaining a pH of 6.

The disazo compound according to the invention is isolated as a dark blue, electrolyte-containing (sodium chloride-containing) sodium salt by evaporating (for example spray drying) the synthesis solution; it has the formula

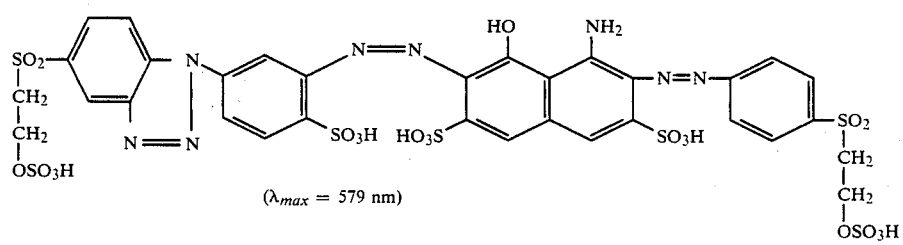

($\lambda_{max}$ = 579 nm)

written in the form of the free acid, and is distinguished by very good fiber-reactive dye properties. It dyes the fiber materials mentioned in the description, such as, in particular, cellulose fiber materials, for example cotton, by the application methods which are customary in industry for fiber-reactive dyes in intense navy blue, fast shades having a high degree of fixing. Of the good fastness properties of the dyeings and prints obtainable using the azo compound according to the invention, the good chlorinated water, light, alkaline and acidic perspiration light and wash fastness properties at 60° C. and 95° C., in particular, may be emphasized.

EXAMPLES 106 TO 122

In the following tabulated Examples, further azo compounds according to the invention corresponding to a general formula $D^1$-N=N-$K^1$ are described with the aid of their components $D^1$ and $K^1$. They can be prepared in a manner according to the invention, for example in accordance with the working Examples above, by coupling the coupling component H-$K^1$ with the diazonium salt of the diazo component $D^1$-NH$_2$, and likewise have very good fiber-reactive dye properties. They give intense dyeings and prints, such as, for example, on cellulose fiber materials, with the hue (here on cotton) given in the particular tabulated Example, having good fastness properties; the values in parentheses represent the absorption maxima ($\lambda_{max}$) in nm.

| Ex. | $D^1$— radical | —$K^1$ radical | Hue |
|---|---|---|---|
| 106 | 2-Sulfo-5-[5'-(β-sulfatoethylsulfonyl)-1',2',3'-benzotriazol-1'-yl]-phenyl | 3,6-Disulfo-1-amino-2-[2'-sulfo-4'-(β-sulfatoethylsulfonyl)-phenyl-diazoyl]-8-hydroxy-naphth-7-yl | navy blue |
| 107 | 2-Sulfo-5-[5'-(β-sulfatoethylsulfonyl)-1',2',3'-benzotriazol-1'-yl]-phenyl | 3,6-Disulfo-1-amino-2-[3'-(β-sulfatoethylsulfonyl)-phenyl-diazoyl]-8-hydroxy-naphth-7-yl | navy blue |
| 108 | 2-Sulfo-5-[5'-(β-sulfatoethylsulfonyl)-1',2',3'-benzotriazol-1'-yl]-phenyl | 3,6-Disulfo-1-amino-2-[2'-sulfo-5'-(β-sulfatoethylsulfonyl)-phenyl-diazoyl]-8-hydroxy-naphth-7-yl | navy blue |
| 109 | 4-(β-Sulfatoethylsulfonyl)-phenyl | 3,6-Disulfo-1-amino-2-{2'-sulfo-5'-[5''-(β-sulfatoethylsulfonyl)-1'',2'',3''-benzotriazol-1''-yl]-phenyl-diazoyl}-8-hydroxy-naphth-7-yl | navy blue |
| 110 | 2-Sulfo-4-(β-sulfatoethylsulfonyl)-phenyl | 3,6-Disulfo-1-amino-2-{2'-sulfo-5'-[5''-(β-sulfatoethylsulfonyl)-1'',2'',3''-benzotriazol-1''-yl]-phenyl-diazoyl}-8-hydroxy-naphth-7-yl | navy blue |
| 111 | 3-(β-Sulfatoethylsulfonyl)-phenyl | 3,6-Disulfo-1-amino-2-{2'-sulfo-5'-[5''-(β-sulfatoethylsulfonyl)-1'',2'',3''-benzotriazol-1''-yl]-phenyl-diazoyl}-8-hydroxy-naphth-7-yl | navy blue |
| 112 | 2-Sulfo-5-(β-sulfatoethylsulfonyl)-phenyl | 3,6-Disulfo-1-amino-2-{2'-sulfo-5'-[5''-(β-sulfatoethylsulfonyl)-1'',2'',3''-benzotriazol-1''-yl]-phenyl-diazoyl}-8-hydroxy-naphth-7-yl | navy blue |
| 113 | 2-Sulfo-4-[5'-(β-sulfatoethylsulfonyl)-1',2',3'-benzotriazol-1'-yl]phenyl | 3,6-Disulfo-1-amino-2-[2'-sulfo-4'-(β-sulfatoethylsulfonyl)-phenyl-diazoyl]-8-hydroxy-naphth-7-yl | navy blue (615) |
| 114 | 2-Sulfo-4-[5'-(β-sulfatoethylsulfonyl)-1',2',3'-benzotriazol-1'-yl]phenyl | 3,6-Disulfo-1-amino-2-[3'-(β-sulfatoethylsulfonyl)-phenyl-diazoyl]-8-hydroxy-naphth-7-yl | navy blue (595) |
| 115 | 2-Sulfo-4-[5'-(β-sulfatoethylsulfonyl)-1',2',3'-benzotriazol-1'-yl]phenyl | 3,6-Disulfo-1-amino-2-[2'-sulfo-5'-(β-sulfatoethylsulfonyl)-phenyl-diazoyl]-8-hydroxy-naphth-7-yl | navy blue |
| 116 | 4-(β-Sulfatoethyl- | 3,6-Disulfo-1-amino-2- | navy blue |

-continued

| Ex. | D¹– radical | –K¹ radical | Hue |
|---|---|---|---|
| | sulfonyl)-phenyl | {2'-sulfo-4'-[5''-(β-sulfatoethylsulfonyl)-1'',2'',3''-benzotriazol-1''-yl]-phenyl-diazoyl}-8-hydroxy-naphth-7-yl | (607) |
| 117 | 2-Sulfo-4-(β-sulfatoethylsulfonyl)-phenyl | 3,6-Disulfo-1-amino-2-{2'-sulfo-4'-[5''-(β-sulfatoethylsulfonyl)-1'',2'',3''-benzotriazol-1''-yl]-phenyl-diazoyl}-8-hydroxy-naphth-7-yl | navy blue (606) |
| 118 | 3-(β-Sulfatoethylsulfonyl)-phenyl | 3,6-Disulfo-1-amino-2-{2'-sulfo-4'-[5''-(β-sulfatoethylsulfonyl)-1'',2'',3''-benzotriazol-1''-yl]-phenyl-diazoyl}-8-hydroxy-naphth-7-yl | navy blue |
| 119 | 2-Sulfo-5-(β-sulfatoethylsulfonyl)-phenyl | 3,6-Disulfo-1-amino-2-{2'-sulfo-4'-[5''-(β-sulfatoethylsulfonyl)-1'',2'',3''-benzotriazol-1''-yl]-phenyl-diazoyl}-8-hydroxy-naphth-7-yl | navy blue |
| 120 | 2-Sulfo-4-[5'-(β-sulfatoethylsulfonyl)-1',2',3'-benzotriazol-1'-yl]-phenyl | 3,6-Disulfo-1-amino-2-{2'-sulfo-4'-[5''-(β-sulfatoethylsulfonyl)-1'',2'',3''-benzotriazol-1''-yl]-phenyl-diazoyl}-8-hydroxy-naphth-7-yl | navy blue |
| 121 | 2-Sulfo-5-[5'-(β-sulfatoethylsulfonyl)-1',2',3'-benzotriazol-1'-yl]-phenyl | 3,6-Disulfo-1-amino-2-{2'-sulfo-4'-[5''-(β-sulfatoethylsulfonyl)-1'',2'',3''-benzotriazol-1''-yl]-phenyl-diazoyl}-8-hydroxy-naphth-7-yl | navy blue |
| 122 | 2-Sulfo-4-[5'-(β-sulfatoethylsulfonyl)-1',2',3'-benzotriazol-1'-yl]-phenyl | 3,6-Disulfo-1-amino-2-{2'-sulfo-5'-[5''-(β-sulfatoethylsulfonyl)-1'',2'', 3''-benzotriazol-1'''-yl]-phenyl-diazoyl}-8-hydroxy-naphth-7-yl | navy blue |

We claim:
1. A water-soluble azo compound which corresponds to the formula 1:

D—N=N—K    (1)

in which D is a group of the formula 2:

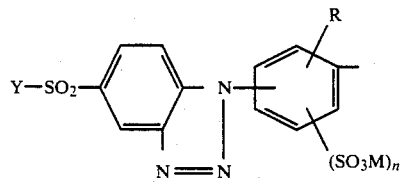

in which
Y is vinyl or a group of the formula

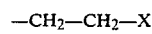

—CH₂—CH₂—X in which
X is a substituent which is eliminated by means of an alkali with formation of the vinyl group,
R is hydrogen, hydroxy, alkyl having 1 to 4 carbon atoms, alkoxy having 1 to 4 carbon atoms, carboxy or halogen, n is the number zero or 1,
M is hydrogen or an alkali metal, and the free bond from the benzene ring to the azo group is bound in the meta- or para-position to the one nitrogen atom of the benzotriazole radical;

K is a radical selected from radicals of the formulae (4a)-(4i), (4k), (4m), (4n), (4p)-(4t), (4v) or (4w)

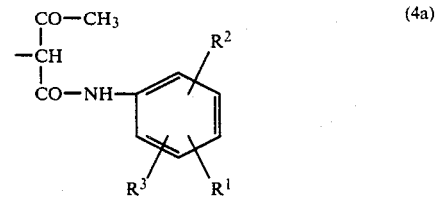

(4a)

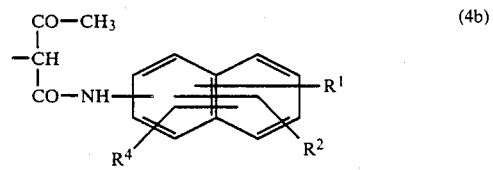

(4b)

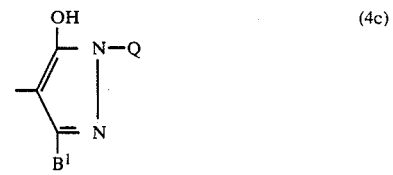

(4c)

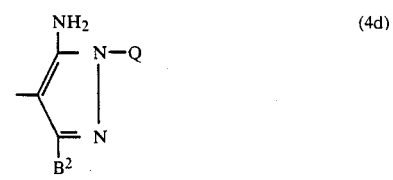

(4d)

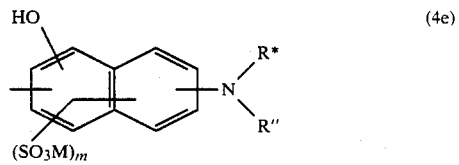

(4e)

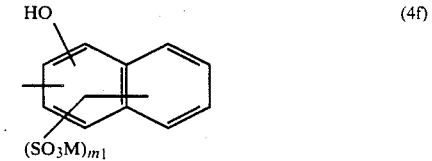

(4f)

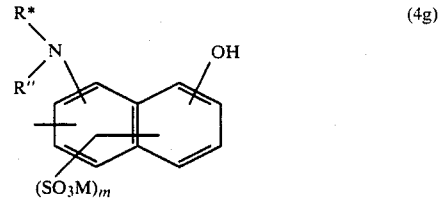

(4g)

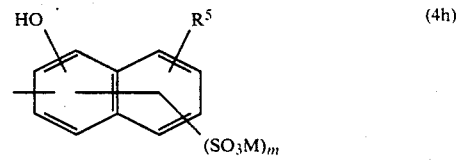

(4h)

-continued

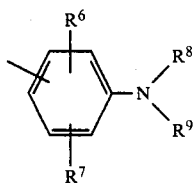 (4i)

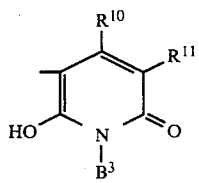 (4k)

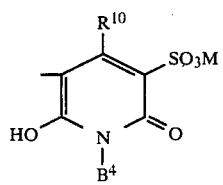 (4m)

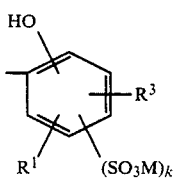 (4n)

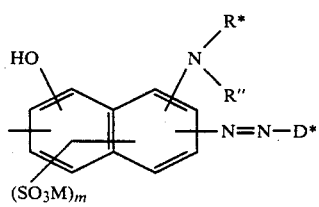 (4p)

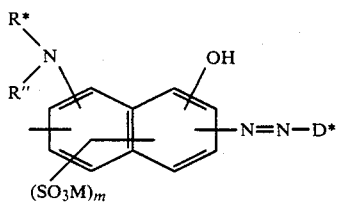 (4q)

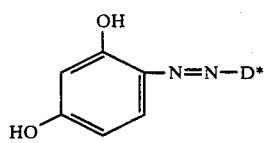 (4r)

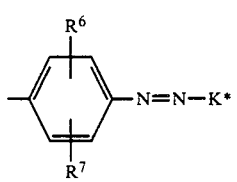 (4s)

-continued

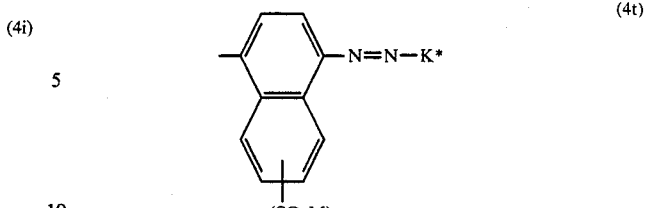 (4t)

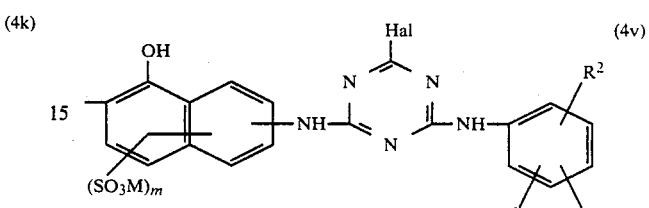 (4v)

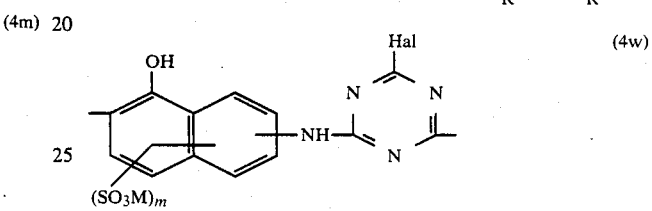 (4w)

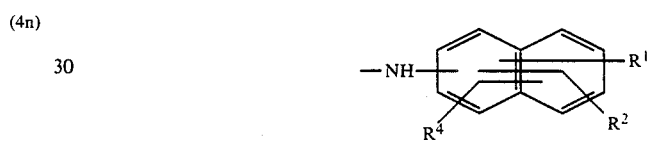

wherein:
$R^1$ is hydrogen, carboxy or sulfo or a group of the formula —$SO_2$—Y where Y has one of the above-mentioned meanings;
$R^2$ is hydrogen, alkyl having 1 to 4 carbon atoms, alkoxy having 1 to 4 carbon atoms, chlorine, bromine, carboxy or sulfo;
$R^3$ is hydrogen, alkyl having 1 to 4 carbon atoms, alkoxy having 1 to 4 carbon atoms, chlorine or bromine;
$R^4$ is hydrogen, sulfo or carboxy;
$R^1$, $R^2$, $R^3$ and $R^4$ may have meanings which are identical to one another or different from one another;
$B^1$ is alkyl having 1 to 4 carbon atoms, carboxy, carbalkoxy having 2 to 5 carbon atoms, carbamoyl or phenyl which is unsubstituted or substituted by substituents selected from sulfo, carboxy, methyl, ethyl, methoxy, ethoxy and chlorine;
$B^2$ is alkyl having 1 to 4 carbon atoms, carbalkoxy having 2 to 5 carbon atoms, carbamoyl or phenyl which is unsubstituted or substituted by 1 or 2 substituents selected from alkyl having 1 to 4 carbon atoms, alkoxy having 1 to 4 carbon atoms, chlorine, bromine and sulfo;
Q is phenyl which is unsubstituted or substituted by 1,2 or 3 substituents selected from chlorine, bromine, methyl, ethyl, methoxy, ethoxy, carboxy, sulfo and alkanoylamino or by a group of the formula —$SO_2$—Y, where Y has one of the above-mentioned meanings, or by said group —$SO_2$—Y and by 1, 2 or 3 of those substituents mentioned, or is a naphthyl which is unsubstituted or substituted by 1, 2 or 3 sulfo groups or by 1, 2 or 3 sulfo groups and by an alkyl having 1 to 4 carbon atoms, an alkoxy having 1 to 4 carbon atoms, a chlorine, an alkanoylamino having 2 to 5 carbon atoms or a group of the formula —$SO_2$—Y where Y has one of the above-mentioned meanings;

R* is hydrogen, alkyl having 1 to 4 carbon atoms or alkyl having 1 to 4 carbon atoms substituted by a phenyl;

R" is hydrogen or an alkyl having 1 to 4 carbon atoms which is unsubstituted or substituted by a phenyl, or is phenyl which is unsubstituted or substituted by one or two substituents selected from alkyl having 1 to 4 carbon atoms, alkoxy having 1 to 4 carbon atoms, chlorine, bromine and sulfo;

$R^5$ is phenylureido, alkanoylamino having 2 to 5 carbon atoms, alkenoylamino having 3 to 5 carbon atoms, benzoylamino or benzoylamino substituted by substituents selected from chlorine, methyl, methoxy, nitro, sulfo and carboxy;

$R^6$ is hydrogen, alkyl having 1 to 4 carbon atoms, alkoxy having 1 to 4 carbon atoms, sulfo, carboxy, carbalkoxy having 2 to 5 carbon atoms, halogen or alkoxy having 1 to 4 carbon atoms substituted by a hydroxy, acetyloxy, carboxy, carbamoyl, cyano or halogen;

$R^7$ is hydrogen, alkyl having 1 to 4 carbon atoms, alkoxy having 1 to 4 carbon atoms, halogen, cyano, trifluoromethyl, alkoxy having 1 to 4 carbon atoms substituted by a hydroxy, acetyloxy, carboxy, carbamoyl, cyano or halogen, or is alkanoylamino having 2 to 5 carbon atoms unsubstituted or substituted by chlorine, bromine, alkoxy having 1 to 4 carbon atoms, phenoxy, phenyl, hydroxy, carboxy or sulfo, or is alkenoylamino having 3 to 5 carbon atoms unsubstituted or substituted by chlorine, bromine, carboxy or sulfo, or is benzoylamino unsubstituted or substituted in the benzene ring by substituents selected from chlorine, methyl, and sulfo, or is alkylsulfonyl having 1 to 4 carbon atoms or is phenylsulfonyl unsubstituted or substituted in the benzene ring by substituents selected from chlorine, methyl and sulfo, or is alkylsulfonylamino having 1 to 4 carbon atoms which is unsubstituted or substituted by hydroxy, sulfato, chlorine, bromine or alkoxy having 1 to 4 carbon atoms, or is phenylsulfonylamino which is unsubstituted or substituted in the benzene ring by substituents selected from chlorine, methyl and sulfo; or is carbamoyl or carbamoyl monosubstituted or disubstituted on the nitrogen atom by 1 or 2 substituents selected from alkyl having 1 to 4 carbon atoms, alkyl having 1 to 4 carbon atoms substituted by hydroxy, sulfo, carboxy, sulfato or phenyl, cycloalkyl having 5 to 8 carbon atoms, phenyl and phenyl substituted by substituents selected from chlorine, sulfo, methyl, methoxy and carboxy; or is sulfamoyl or sulfamoyl monosubstituted or disubstituted on the nitrogen atom by 1 or 2 substituents selected from alkyl having 1 to 4 carbon atoms, alkyl having 1 to 4 carbon atoms substituted by hydroxy, sulfo, carboxy, sulfato or phenyl, cycloalkyl having 5 to 8 carbon atoms, phenyl and phenyl substituted by substituents selected from chlorine, sulfo, methyl, methoxy and carboxy; or is ureido or ureido monosubstituted or disubstituted on the terminal nitrogen atom by 1 or 2 substituents selected from alkyl having 1 to 4 carbon atoms, alkyl having 1 to 4 carbon atoms substituted by hydroxy, sulfo, carboxy, sulfato or phenyl, cycloalkyl having 5 to 8 carbon atoms, phenyl and phenyl substituted by substituents selected from chlorine, sulfo, methyl, methoxy and carboxy;

$R^8$ is hydrogen or alkyl having 1 to 4 carbon atoms unsubstituted or substituted by hydroxy, sulfo, carboxy, sulfato or phenyl, or is alkenyl having 2 to 4 carbon atoms unsubstituted or substituted by a carboxy, sulfo, chlorine or bromine, or is cycloalkyl having 5 to 8 carbon atoms;

$R^9$ is hydrogen or alkyl having 1 to 4 carbon atoms unsubstituted or substituted by hydroxy sulfo, carboxy, sulfato or phenyl, or is alkenyl having 2 to 5 carbon atoms unsubstituted or substituted by a carboxy, sulfo, chlorine or bromine, or is cycloalkyl having 5 to 8 carbon atoms or is phenyl unsubstituted or substituted by substituents selected from chlorine, sulfo, methyl, methoxy and carboxy, or is a naphthyl unsubstituted or substituted by 1, 2 or 3 sulfo or by 1,2 or 3 sulfo and by a chlorine, an alkoxy having 1 to 4 carbon atoms, an alkyl having 1 to 4 carbon atoms, an alkanoylamino having 2 to 5 carbon atoms or a benzoylamino unsubstituted or substituted by sulfo;

$R^8$ and $R^9$ are, together with the nitrogen atom, morpholino or piperazino;

$R^{10}$ is hydroqen or alkyl having 1 to 4 carbon atoms or alkyl having 1 to 4 carbon atoms substituted by alkoxy having 1 to 4 carbon atoms or by cyano;

$R^{11}$ is hydrogen, sulfo, sulfoalkyl having 1 to 4 carbon atoms, cyano or carbamoyl;

R*, R", $R^1$, $R^5$, $R^6$, $R^7$, $R^8$, $R^9$, $R^{10}$ and $R^{11}$ may have meanings which are identical to one another or different from one another;

$B^3$ is hydrogen or alkyl having 1 to 6 carbon atoms or alkyl having 1 to 6 carbon atoms substituted by phenyl, sulfo or sulfophenyl;

$B^4$ is hydrogen, alkyl having 1 to 4 carbon atoms, alkyl having 1 to 4 carbon atoms which is substituted by an alkoxy having 1 to 4 carbon atoms, a sulfo, a carboxy, a sulfato, an acetylamino, a benzoylamino or a cyano; or is alkenyl having 2 to 4 carbon atoms, cyclohexyl, phenyl or phenyl substituted by substituents selected from carboxy, sulfo, benzoylamino, acetylamino and chlorine;

k is the number zero or 1 and where k=zero the group represents hydrogen;

m is the number 1 or 2;

$m_1$ is the number 1, 2 or 3;

D* is a group of the formula (2) as defined above, or is phenyl unsubstituted or substituted by 1, 2 or 3 substituents selected from alkyl having 1 to 4 carbon atoms, alkoxy having 1 to 4 carbon atoms, chlorine, bromine, hydroxy, carboxy, sulfo, carbamoyl, sulfamoyl, alkanoylamino and a group —$SO_2$—Y where Y has one of the above-mentioned meanings, or is a naphthyl substituted by 1, 2 or 3 sulfo or by 1 or 2 sulfo and 1 or 2 groups of the formula —$SO_2$—Y where Y has one of the above-mentioned meanings, or by one group —$SO_2$—Y;

D and D* may have meanings which are identical to one another or different from one another;

K* is a group corresponding to one of the above formulae (4a) to (4m), and K and K* may have meanings which are identical to one another or different from one another;

Hal is fluorine or chlorine; and

M has one of the above-mentioned meanings.

2. A compound as claimed in claim 1, wherein K is a group of the formula

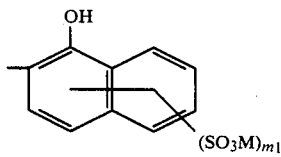

in which $m_1$ is 1, 2 or 3.

3. A compound as claimed in claim 1, wherein X is a group of the formula

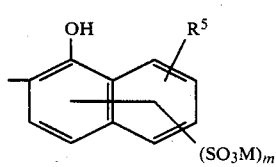

in which $R^5$ is benzoylamino or alkanoylamino having 2 to 5 carbon atoms, and m is 1 or 2.

4. A compound as claimed in claim 1, wherein K is a group of the formula

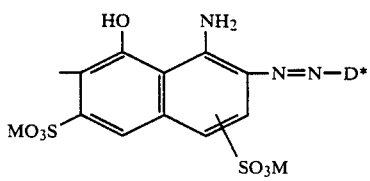

in which D* is a group of the formula

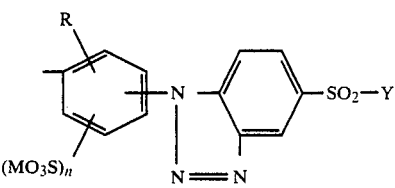

in which R, M, n and Y have one of the meanings mentioned in claim 1.

5. A compound as claimed in claim 1, wherein K is a group of the formula

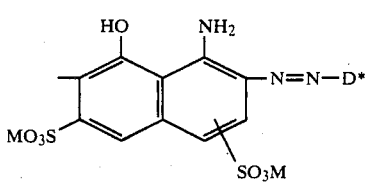

in which M has one of the meanings mentioned in claim 1 and D* is phenyl unsubstituted or substituted by a group of the formula —$SO_2$—Y where Y has a meaning mentioned in claim 1, or by 1, 2 or 3 substituents selected from alkyl having 1 to 4 carbon atoms, alkoxy, carboxy, sulfo, carbamoyl, sulfamoyl and alkanoylamino having 2 to 5 carbon atoms, or by said group of the formula —$SO_2$—Y and by 1, 2 or 3 of the above-mentioned substituents, or D* is a naphthyl unsubstituted or substituted by 1, 2 or 3 sulfo groups or by 1 or 2 sulfo groups and 1 or 2 groups of the formula —$SO_2$—Y where Y has a meaning mentioned in claim 1, or by only one such —$SO_2$—Y group.

6. A compound as claimed in claim 1, wherein n is 1.

7. A compound as claimed in claim 1 wherein R is hydrogen.

8. A compound as claimed in claim 1 wherein Y is vinyl or β-sulfatoethyl.

9. A compound as claimed in claim 1, wherein Y is β-sulfatoethyl.

10. A compound as claimed in claim 1, wherein M is hydrogen or an alkali metal.

* * * * *